May 31, 1966 E. H. LAMBOURN 3,254,240

ELECTRONIC GATING CIRCUITS

Filed March 13, 1963 2 Sheets-Sheet 1

United States Patent Office 3,254,240
Patented May 31, 1966

3,254,240
ELECTRONIC GATING CIRCUITS
Edward Harry Lambourn, London, England, assignor to International Standard Electric Corporation, New York, N.Y., a corporation of Delaware
Filed Mar. 13, 1963, Ser. No. 264,936
Claims priority, application Great Britain, Mar. 27, 1962, 11,628/62
11 Claims. (Cl. 307—88.5)

This invention relates to electronic gating circuits.

According to the present invention there is provided an electronic gating circuit, which comprises a controlled path for signal currents the input and output of which are interconnected via the emitter-collector paths of one or more transistors, control means for said controlled path connected to the base or bases of said one or more transistors and adapted to block or to unblock said controlled path, at least one auxiliary semiconductor device connected between said input and said control means so as to isolate the latter from said input when the controlled path is blocked, and at least one auxiliary semiconductor device connected between said output and said control means so as to isolate the latter from said output when the controlled path is blocked.

According to the present invention there is also provided a transistor gate in which a signal current in the emitter-collector paths of one or more transistors is base-controlled, the circuit in which the base-controlling current is applied including an auxiliary current path which includes the emitter-collector paths of one or more transistors, so that the controlling and controlled inputs to the transistor gate are effectively isolated from each other when the transistor gate is closed.

According to the present invention there is further provided an electronic gating circuit including a main transistor gate, a first auxiliary transistor gate connected between the collector and the base of the main gate, a second similar auxiliary transistor gate connected between the emitter and the base of the main gate, biasing means for maintaining the main and auxiliary gates in a closed condition, input means for temporarily overcoming the biasing means, whereby the auxiliary gates are opened and allow a base current to flow in the base circuit of the main gate, said base current serving to open the main gate, each auxiliary gate having connected between the collector and emitter thereof a diode arranged to pass residual base currents flowing in the base of the main gate after the closing of the main and auxiliary gates.

In order that the invention may be more clearly understood it is now described with reference to the accompanying drawings in which.

Figure 1:
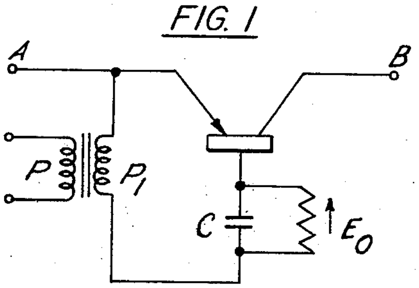
FIG. 1 illustrates a simple electronic gate utilizing a transistor.

In the simple gate depicted in FIG. 1 the transistor T is held in the closed or shut condition by the hold-off voltage $E_0$. In this condition the transistor T will not pass any current between A and B, until such times as an input pulse is applied to the transformer P. This input pulse induces a voltage pulse in the secondary winding $P_1$ which is sufficient to oppose and overcome the voltage $E_0$ and therefore causes the transistor to conduct, i.e. the gate is opened. The capacitor C stores a charge due to the current flowing out of the base when the transistor is conducting and the gate is open, and at the cessation of the input pulse the accumulated charge in the capacitor C gives rise to the voltage $E_0$ which holds the gate shut. Of course it is assumed that a further input pulse will be received to re-open the gate before the capacitor C is discharged and $E_0$ disappears, otherwise the gate will not remain properly closed.

Figure 2:
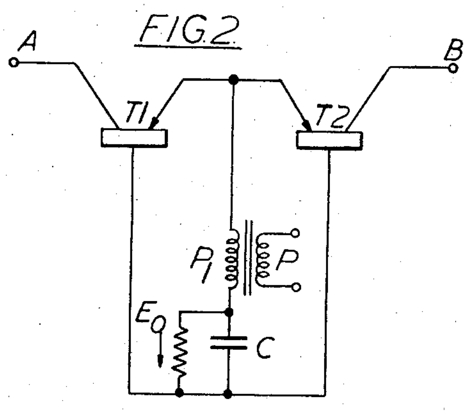
FIG. 2 illustrates a modified simple gate utilizing a pair of transistors.

The gate illustrated in FIG. 1 is primarily a single direction gate if the transistor is a non-symmetrical transistor. The term single direction is meant to indicate a gate which, although it will pass a current in either direction between the emitter and the collector when open, will only remain closed against a substantial voltage in one particular direction, A bi-directional gate is meant to define a gate which not only will pass a current with equal facility in either direction when open but which will also withstand a large voltage in either direction when closed. If the gate is required to be a bi-directional gate having a suitable current gain in either direction then the transistor in FIG. 1 must be a symmetrical transistor. However, a modified gate may be constructed utilizing a pair of non-symmetrical transistors as shown in FIG. 2, this arrangement being known as a series pair. In this circuit the transistors T1 and T2 function in the same manner as the single transistor of FIG. 1, the main advantage being the low value of the voltage $E_0$ required to keep the complete gate closed to much larger voltages appearing across the gate terminals AB. In the case of the single transistor T in FIG. 1 the hold-off voltage $E_0$ is required to withstand the maximum applied reverse voltage, that is when B becomes positive with respect to A, otherwise the gate will break down. In the case of the two transistor gate shown in FIG. 2 the gate will withstand considerable terminal voltages in either direction since if both transistors are switched off there is always one transistor capable of withstanding a large applied terminal voltage which is in effect the reverse voltage for that particular translator.

One of the disadvantages, however, of simple gating circuits such as those described above is that spikes of voltage appear at the gate terminals, being caused by voltage transitions with respect to earth at the base and emitter of the transistors due to stray capacities. These unwanted voltage spikes may be kept small if the voltage transitions are small, and hence there arises the need for a very low value of the hold-off voltage $E_0$. These voltage spikes are undesirable for many reasons, one of which is that they tend to charge capacitors in associated filters, etc., connected to the gates, thereby giving rise to spurious pedestal effects.

Figure 3:
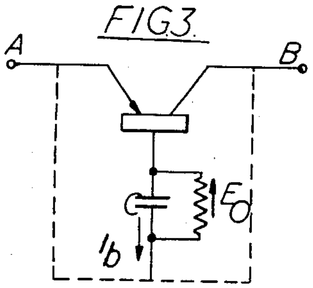
FIG. 3 illustrates an ideal form of gate utilizing a transistor.

It has been proposed that in an ideal form of gate the switching current in the base of the transistor should be drawn from both the collector and the emitter through the base, but without returning externally to these two points. That is to say that the base circuit does not connect with the gate terminals via normal load impedances. It is also necessary in the ideal case for the base circuit to be completely floating such that a minimum hold-off voltage $E_0$ is sufficient to hold the gate closed. The ideal gate is depicted in FIG. 3 in which it will be seen that the base circuit will draw a switching current $I_b$ from both the collector and the emitter without returning this switching current to the collector or emitter. Since in practice there must be some form of return for the switching current to the collector and emitter the invention provides a circuit which to a large extent meets the requirements of the ideal gate.

Figure 4:
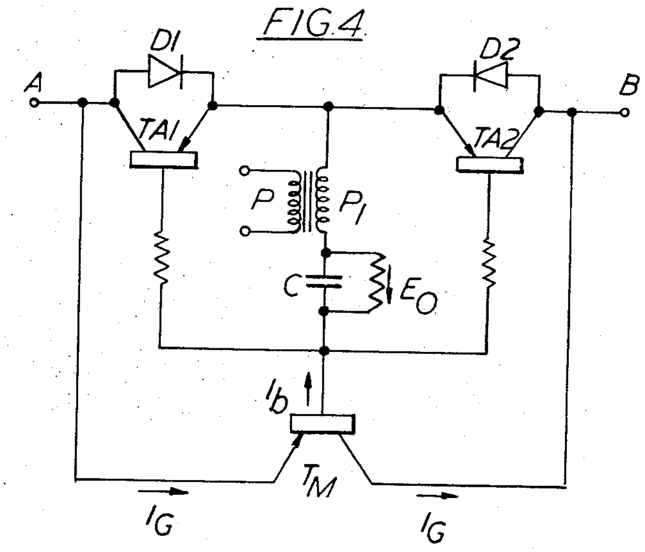
FIG. 4 illustrates a practical circuit for a gate according to the invention.

In the circuit shown in FIG. 4 three transistors are used to construct an electronic gate. The main gating function between the terminals A and B is provided by the transistor TM. This operates in a similar manner to the transistor in the circuit of FIG. 1. That is to say that the transistor is held shut by the voltage $E_0$ and is opened by an input pulse applied to the transformer P, the induced voltage pulse in the secondary winding $P_1$ being sufficient to overcome the voltage $E_0$ and open the main gate. However, the switching current $I_b$ must pass through the auxiliary transistors TA1, and TA2, which are also normally held shut by the voltage $E_0$. Upon the application of the input pulse, not only is TM opened but also TA1 and TA2 are caused to conduct thereby allowing the switching current $I_b$ to flow through the auxiliary gates TA1 and TA2 and return to the terminals of the main gate TM. Upon the input pulse ends the voltage $E_0$ is restored and has the effect of cutting off all three transistors, i.e. closing the main and auxiliary gates provided by the transistors. Thus not only is the main current path between A and B, through TM, closed but also the base of TM is disconnected from the collector and emitter of TM. Thus one of the requirements of the ideal gate is achieved. However, since there will be a certain amount of hole-storage current remaining in the circuit the auxiliary gates TA1 and TA2 are equipped with diodes D1 and D2 connected between their collector and emitter electrodes respectively which allow any hole-storage current remaining to flow after cessation of the switching pulse. As a result of the flow of hole-storage current through the diodes after the auxiliary gates TA1 and TA2 are closed, the main gate TM can be closed without undue delay.

The other requirement of the ideal gate, that is, that the voltage $E_0$ be completely floating, is also achieved since the capacitor C is, in the closed condition of the gate, disconnected from the terminals A and B. However, if there should be any change in potential at either A or B the voltage $E_0$ will remain constant but its potential with respect to earth will rise or fall accordingly since current paths exist through the transistors TA1 and TA2 and the diodes D1 and D2.

The low value of $E_0$ requires only a low voltage switching pulse ensuring minimum spike induction at the output terminals. The transistor TM in FIG. 4 would normally be a symmetrical transistor with bi-directional high gain and therefore the base current is small for large gate current handling. Since the base current $I_b$ from TM flows through TA1 and TA2 in the forward direction and they have high current gain in this direction, the base currents for TA1 and TA2 need only be small themselves. Furthermore, as has been stated above, the main gate current $I_g$ in this circuit is carried, to all intents and purposes entirely by the transistor TM, and the transistors TA1 and TA2 are therefore concerned with passing only a proportion of the base current $I_b$ from the transistor TM.

Figure 5:
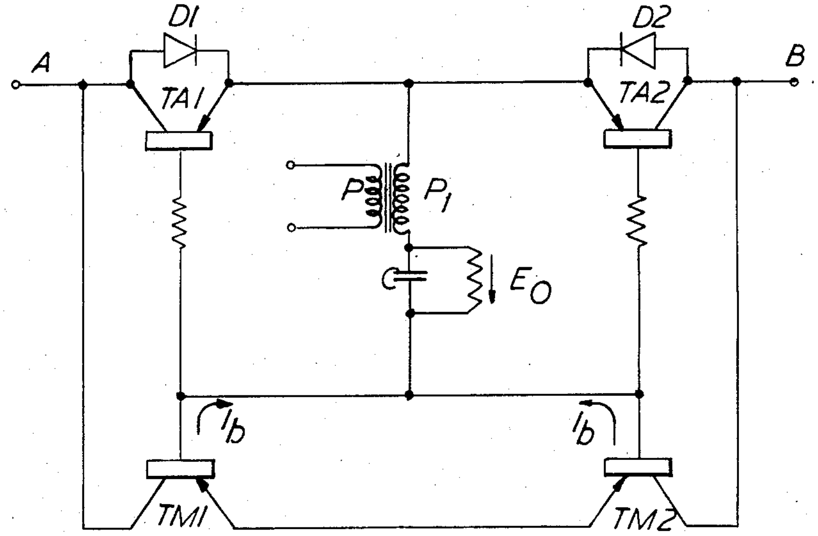
FIGS. 5 and 6 illustrate alternative forms of FIG. 4.

If it is desired to reduce the cost of the circuit shown in FIG. 4, the symmetrical transistor TM may be replaced by the non-symmetrical transistors TM1 and TM2 of FIG. 5. This circuit corresponds to the simple gate shown in FIG. 2. In all other respects it is identical with and functions in the same manner as the circuit of FIG. 4. Once again the transistors TM1 and TM2 carry the main controlled current $I_g$ between A and B and the transistors TA1 and TA2 provide the auxiliary gates to control the base current $I_b$. Similarly the diodes D1 and D2 allow the flow of hole-storage current after the cessation of the switching pulse.

Figure 6:
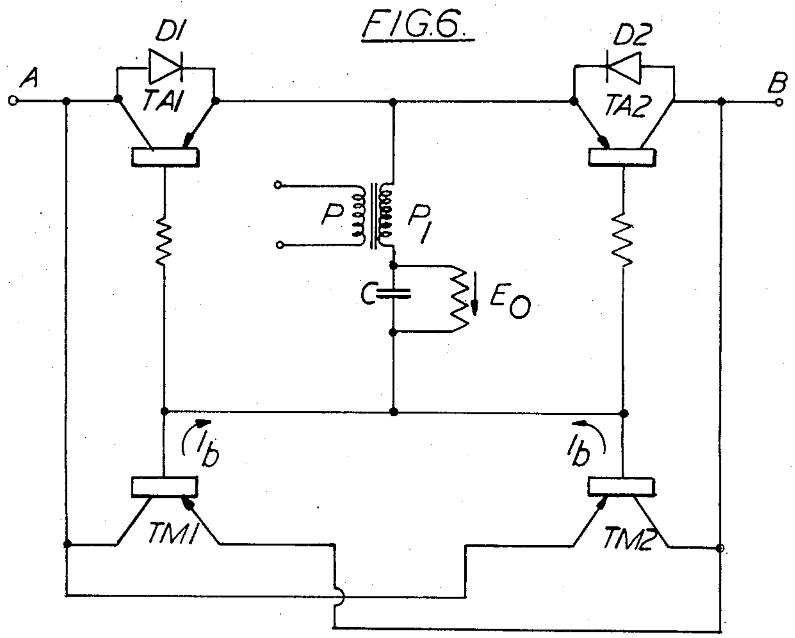

In an alternative circuit to FIG. 5, the symmetrical transistor TM of FIG. 4 is replaced by a pair of non-symmetrical transistors TM1 and TM2 connected in parallel as shown in FIG. 6. In all other respects FIG. 6, is the same as FIG. 5, but the current handling capabilities of the gate are increased. Once again the base currents $I_b$ are controlled by the transistors TA1 and TA2, and hole-storage currents are allowed to flow through the diodes D1 and D2 after the cessation of the switching pulse in the winding P.

In FIGS. 4, 5 and 6 the auxiliary gates TA1 and TA2 are shown as being connected emitter to emitter but if desired these connections may be reversed and the emitters connected instead to the gate terminals A and B, but modifications of the switching currents are required.

Figure 7:
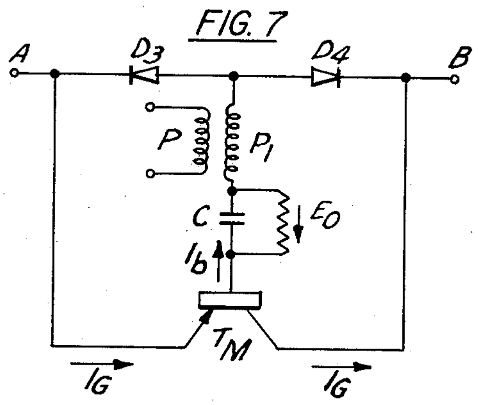
FIG. 7 illustrates an alternative circuit utilizing diodes as the auxiliary gates.

The auxiliary gates TA1 and TA2 and their accompanying diodes D1 and D2 may be replaced by the diodes D3 and D4 as shown in FIG. 7, and although FIG. 7 is a modification of FIG. 4, it applies equally well to the circuits of FIG. 5 and FIG. 6. The hole storage of the diodes D3 and D4 should be matched to that of the transistor TM. When the gate is closed, the hold-off voltage $E_0$ reverse biases the diodes and the transistor, and it must be large enough to withstand the highest potential which may occur across the terminals A and B. This circuit provides a symmetrical balanced gate having fewer components than the equivalent circuits using transistors as the auxiliary gates but it does not have the advantage of the very small magnitude of $E_0$, which is a feature of the circuits of FIGS. 4, 5 and 6.

It is to be understood that the foregoing description of specific examples of this invention is not to be considered as a limitation on its scope.

What I claim is:

1. An electronic gate circuit comprising switching means having mutually exclusive on and off conditions, said switching means including at least one transistor having emitter, collector and base, means for selectively turning said switch means on and off so that current flows through said switching means only when said switch is turned on, means responsive to turning on said switch for selectively conducting the flow of signal current through a principal circuit including said emitter and collector, means including a current control circuit coupled to the base of said transistor for selecting between said conducting and said blocking conditions, means associated with said base circuit for drawing substantially all switching current from the emitter-collector circuit of said transistor through said base with substantially no return of said switching current to said emitter-collector circuit, said last named means including means whereby said base is normally biased to hold said transistor "off", thus causing said blocking of current in said principal circuit, and auxiliary electronic means having stable on and off conditions for selectively and latchingly interconnecting or isolating the base with the emitter-collector parts of said transistor.

2. The gate circuit of claim 1 wherein said base circuit comprises transformer means capacitively coupled to said base, and means responsive to successive pulse signals transmitted through said transformer to said capacitor for overcoming said normal base bias and holding said transistor "on" as long as said pulses continue.

3. The gate circuit of claim 2 wherein said base circuit comprises the following series circuit: the base of said transistor, a parallel resistor-capacitor combination, a secondary winding of said transformer, and an electrode in the emitter-collector circuit of said transistor, the source of said pulses being connected to the primary winding of said transformer.

4. The gate circuit of claim 1 wherein said base circuit comprises auxiliary gate means connected across said emitter-collector circuit for applying signals to said base while isolating said base from electrical effects in said principal circuit.

5. The gate circuit of claim 4 wherein said auxiliary means includes a three branched parallel circuit extending from the base of said transistor, one branch of which comprises a resistor, and the base of a second transistor, a second branch of which comprises a resistor and the base of a third transistor, and a third branch of which comprises a parallel resistor-capacitor combination in series with the secondary winding of a transformer, and a series circuit traced from the emitter to the collector of the first named transistor, said series circuit including the emitter-collector circuits of said second and third transistors with said third branch connected therebetween.

6. The gate circuit of claim 5 wherein the emitters of said second and third transistors and one end of said secondary winding are connected together, the collector of said second transistor is connected to the emitter of said first transistor, and the collector of said third transistor is connected to the collector of said first transistor.

7. The gate circuit of claim 6 and two diodes, said diodes being connected across the emitter-collector circuits of said seond and third transistors, the diodes being poled to conduct current resulting from charge carriers stored in said transistors after the second and third transistors switch off.

8. The gate circuit of claim 1 wherein said isolating means comprises at least two semiconductor means connected as a current divider for providing a return path from said controlling means to said primary circuit.

9. The gate circuit of claim 8 and a pulse source, means responsive to pulses from said source for selectively controlling the semiconductor means to provide "on" or "off" signals for said device.

10. The gate circuit of claim 9 and means for causing recombination of stored charge carriers to speed response to said "off" signals.

11. The gate circuit of claim 8 wherein said device divides said principal circuit into two parts, and means for returning one divided part of said current to said principal circuit on one side of said device and another divided part of said current to said principal circuit on the other side of said device.

References Cited by the Examiner

UNITED STATES PATENTS

| | | | |
|---|---|---|---|
| 2,639,386 | 5/1953 | Karpeles | 307—88.5 X |
| 2,862,171 | 10/1958 | Freeborn | 307—88.5 X |
| 2,891,171 | 6/1959 | Shockley | 307—88.5 |
| 2,985,772 | 5/1961 | Pittman | 307—88.5 |
| 2,994,044 | 7/1961 | Straube | 307—88.5 X |
| 3,207,927 | 9/1965 | Wells | 307—88.5 |

ARTHUR GAUSS, *Primary Examiner.*

D. D. FORRER, *Assistant Examiner.*